No. 689,007. Patented Dec. 17, 1901.
G. W. LA VOO.
ROLLS FOR WELDING RINGS.
(Application filed Feb. 23, 1901.)
(No Model.) 2 Sheets—Sheet 1.
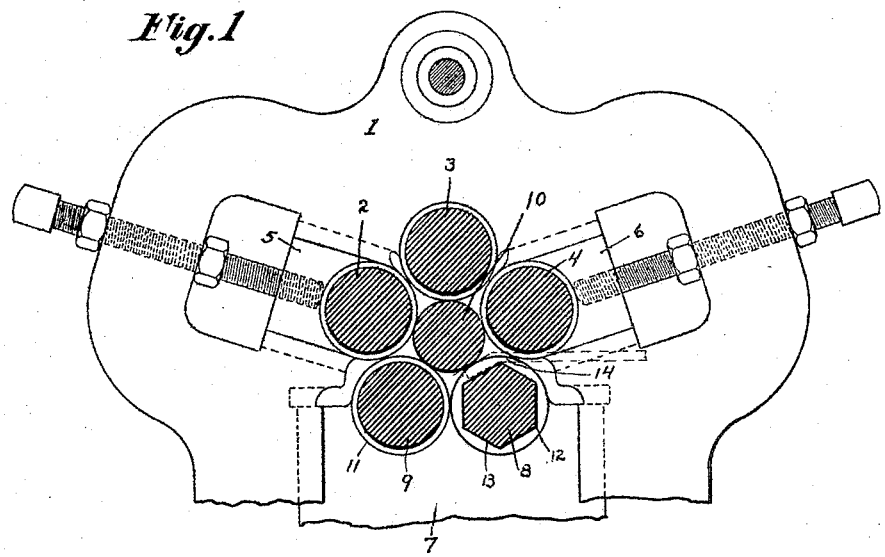
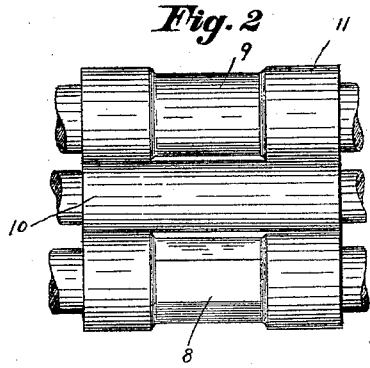
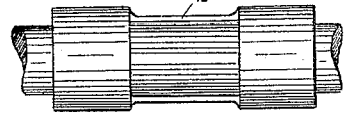 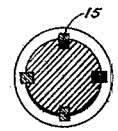
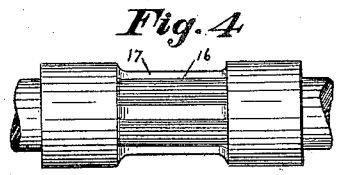 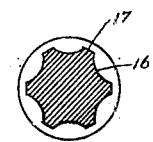
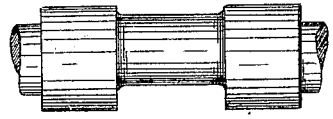 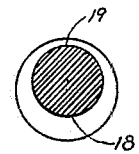
Witnesses.
Fred D. Sweet
Walter Tamaris
Inventor:
George W. La Voo
By Kay & Totten
Attorneys.
THE NORRIS PETERS CO., PHOTO-LITHO., WASHINGTON, D. C.

No. 689,007. Patented Dec. 17, 1901.
G. W. LA VOO.
ROLLS FOR WELDING RINGS.
(Application filed Feb. 23, 1901.)
(No Model.) 2 Sheets—Sheet 2.
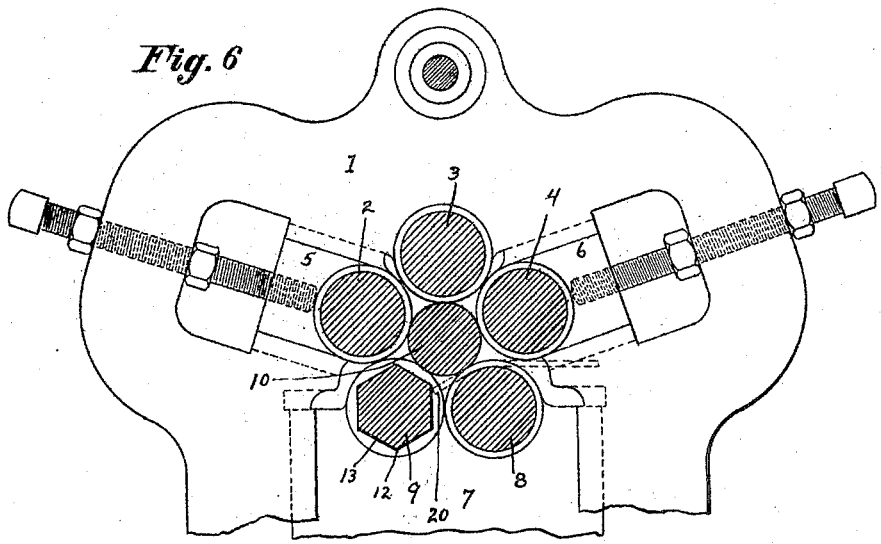
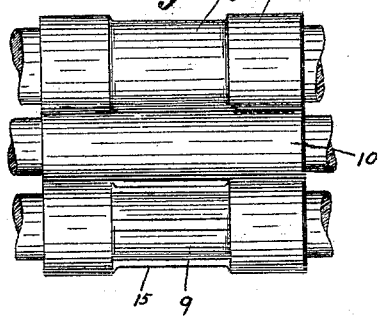
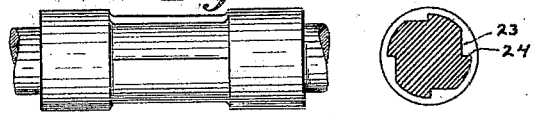
Witnesses,
Fred D Sweet
Walter Samaries
Inventor:
George W La Voo.
By King & Totten
Attorneys.

UNITED STATES PATENT OFFICE.

GEORGE W. LA VOO, OF PITTSBURG, PENNSYLVANIA, ASSIGNOR TO NATIONAL TUBE COMPANY, OF NEW YORK, N. Y., A CORPORATION OF NEW JERSEY.

ROLLS FOR WELDING RINGS.

SPECIFICATION forming part of Letters Patent No. 689,007, dated December 17, 1901.

Application filed February 23, 1901. Serial No. 48,455. (No model.)

*To all whom it may concern:*

Be it known that I, GEORGE W. LA VOO, a resident of Pittsburg, in the county of Allegheny and State of Pennsylvania, have invented a new and useful Improvement in Rolls for Welding Rings; and I do hereby declare the following to be a full, clear, and exact description thereof.

My invention relates to apparatus for the manufacture of rings and like articles—such as ordinary metal rings, bands, pipe-couplings, thread-protectors, &c.—its object being to provide a suitable set of welding-rolls for this purpose which will insure the wrapping of the blank around the central mandrel and prevent it from sticking either at the point of entrance between the entering-roll and the mandrel or between the first and second rolls.

The usual machines employed for manufacturing rings and similar articles have a cluster of rolls around a central circular or cylindrical mandrel, the rolls all having circular or cylindrical working faces, and the blank is fed in between two of the rolls and wrapped around the mandrel and welded by the contact of the rolls. The end of the blank is grasped between the entering-roll and the mandrel, and inasmuch as the working face of the former is circular or cylindrical the end of the blank is liable to be bent into curved form and adhere to the surface of the entering-roll and be carried down thereby into the space between said entering-roll and the next adjacent roll, where it will stick and whence it must be removed and thrown away. To prevent the end of the blank being carried down into the space between the first and second rolls, a concave-faced guide has been placed in this space, over which the heated blank is led to prevent it winding around the first or entering roll; but it is found in some cases that the blank will stick between the mandrel and this concave-faced guide, in which case the blank has to be withdrawn and reheated. Furthermore, in some cases in entering the blank between the first roll and mandrel, and especially when the blank is of thick metal and a trifle too thick for the pass, it is liable to stick at this point, the circular or cylindrical working surface of the entering-roll not securing a sufficient grasp on the end of the blank to draw it into the cluster of rolls.

It is the object of the present invention to overcome these difficulties and to provide a construction of rolls which will do away with the necessity of using a concave-faced guide in the space between the first and second rolls, insure the wrapping of the blank upon the mandrel, and which will also insure the blank being drawn between the mandrel and the first roll and prevent its sticking at this point.

To these ends the invention comprises, generally stated, the employment in such a cluster of rolls of one roll which is provided with a working surface having a longitudinal portion or portions thereof extending beyond the other portion or portions thereof, so that it will grip or bite the end of the blank and draw the same between the mandrel and the rolls and will also prevent the curving of the end of the blank, so that it will adhere to the first roll, or if said portion is on the second roll it will catch the downturned end of the blank and lift the same and carry it up over said second roll and prevent its sticking between the two rolls.

In the accompanying drawings, Figure 1 is a vertical cross-section of apparatus embodying the invention. Fig. 2 is a top plan view of the lower rolls and mandrel. Figs. 3, 4, and 5 are side and end views of modified forms of rolls especially adapted for the first or entering roll. Fig. 6 is a vertical cross-section of apparatus, showing the invention applied to the second roll of the cluster. Fig. 7 is a top plan view of the lower rolls and mandrel, showing a modified form of second roll; and Figs. 8, 9, and 10 are side and end views of forms of rolls especially adapted for such second roll.

The apparatus embodying the invention is the ordinary rolling-mill used for this purpose provided with a cluster of five rolls mounted in a housing 1 of the usual construction. Mounted in this housing are the top rolls 2, 3, and 4, which in the welding operation are usually held stationary, the roll 3 being mounted in a fixed bearing, while the rolls 2 and 4 are mounted in adjustable bearings 5 and 6, so that they can be brought to proper relative position with the other rolls in the cluster. Below the said rolls is the sliding bearing 7, which has mounted in its upper end the rolls 8 and 9, so forming the five rolls of the cluster. Fitting within said several rolls is the circular or cylindrical mandrel 10, which is inserted within the cluster before the blank is fed to the rolls and is withdrawn by hand when the welding operation is completed. The several rolls of the cluster have the end flanges 11, adapted to bear upon the mandrel 10, which is of practically the same diameter throughout.

So far the apparatus described is such as is commonly used and embodies no part of the present invention. The present invention consists in providing one or more of said rolls with a working surface having a longitudinal portion or portions thereof projecting beyond the other portion or portions thereof. As shown in Figs. 1 and 2, the entering or first roll 8 is provided with such projecting portion or portions, and in the specific form shown in said figures said roll is hexagonal in cross-section, thereby providing the six longitudinal projecting portions 12 with the intermediate flat surfaces 13. The end of the blank is fed to the rolls between the rolls 8 and 4, as shown at 14, and a portion of the blank corresponding to the width of the surface 13 will remain substantially straight, as shown, whereby said end is not given a tendency to curve downward and adhere to the surface of the roll and be carried down thereby between the rolls 8 and 9, as is the case with ordinary plain-faced circular rolls. Furthermore, the cut-away portions 13 provide an enlarged space between said roll and the mandrel, thereby overcoming the tendency of the blank to stick at this point, while the projecting corners or angles 12 will grip into the blank and positively draw the same forward between the rolls and mandrel. It will thus be seen that this irregularly-shaped roll provides a means for positively feeding the blank between the rolls, so that the blank will not stick in entering the same, and also overcomes the tendency of the end of the blank to curve downward and adhere to the surface of the roll and be carried down between the rolls 8 and 9, but on the contrary insures the proper wrapping of the blank around the mandrel.

It is obvious that the precise form of roll shown in Figs. 1 and 2 is not necessary, but that it is merely necessary to provide a roll having a longitudinal portion or portions thereof projecting beyond the general surface of the roll, with the intermediate flat or cut-away portions, which projecting portion or portions will grip the blank, while the flat or cut-away portions between said gripping portions will provide increased space between the roll and the mandrel for the insertion of the blank and will maintain the end of the blank substantially straight. Modified forms of rolls suitable for such purpose are shown in Figs. 3, 4, and 5. In Fig. 3 the roll 8 is provided with the longitudinal ribs or projections 15, which, as shown, are set into grooves cut into the surface of the roll, but may obviously be secured thereto in any other manner or formed integral therewith. In Fig. 4 the surface of the roll is provided with the longitudinal concave flutings 16, thereby forming the ribs or projections 17, whose function and operation are precisely the same as the ribs 15 in Fig. 3 and projecting angles 12 in Fig. 1, while the concave portion 16 permits of the end of the blank remaining substantially straight in the same manner that the flat surface 13 of the roll shown in Fig. 1 acts. In Fig. 5 the working surface of the roll is formed eccentric with reference to its axis. When such eccentric roll is in position so that the side 18 is adjacent the mandrel, an enlarged space is provided for the entrance of the blank, and the roll gradually grips upon said blank and does not curve it to the same extent that a perfectly circular roll would do. When the side 19 comes opposite the mandrel, the space between the roll and mandrel is reduced to a minimum, so that said side 19 performs the function of the projecting ribs or portions 12, 15, or 17 of the forms of rolls shown in Figs. 1, 3, and 4.

In Fig. 6 the invention is shown as applied to the roll 9, or the second roll of the cluster counting from the entering side of said cluster. As shown in Fig. 6, the roll 9 is hexagonal in cross-section and is provided with the projecting angles 12 and intermediate flat portions 13, as in Fig. 1. When the blank is fed to the cluster between the roll 8 and mandrel 10, its end is curved and has a tendency to follow down with said roll, between the same and the roll 9, as shown at 20. If the roll 9 were a plain-faced circular roll, the projecting end of the blank would not adhere to the surface of said roll 9 with sufficient friction to be lifted thereby and be carried up over the same and around the mandrel 10; but by making said second roll with an irregular working surface the end of the blank will be projected against one of the flat surfaces of the roll, and when the projecting portion 12 comes up it will tend to lift the end of the blank and carry the same over the roll and around the mandrel. In Figs. 8, 9, and 10 modified forms of rolls suitable for this purpose are shown. In Fig. 8 the roll is provided with longitudinal flutings or grooves 21, providing the intermediate ribs or projections 22, and this roll obviously will receive the downturned end of the blank in one of the grooves 21, and a rib or projection 22 will carry the same over the roll and around the mandrel. This roll is somewhat the same as the roll shown in Fig. 4, except that the flutings or grooves are much narrower and more numerous. The roll shown in Fig. 4 obviously would be suitable for use as the second roll of the group, and the roll shown in Fig.

8 would to some extent be useful as the first roll of the group; but inasmuch as the flutings or grooves are narrow it would not be as good as the roll shown in Fig. 4 to prevent the curving downward of the forward end of the blank. In Fig. 9 the roll is provided with the cut-away portions 23, thereby providing the projecting shoulders 24, which engage and positively lift the downturned end of the blank. This is an especially good form of roll for use as the second roll of the group. In Figs. 7 and 10 the roll is provided with ribs 15, precisely as shown in Fig. 3, which ribs obviously engage and lift the end of the blank, as will be readily understood. This roll also is a good form for use as the second roll of the group.

In the operation of the apparatus the blank is entered between the rolls 8 and 4, and if the roll 8 is irregular in cross-section, as described, the blank will be grasped by the projections thereon and positively fed into the cluster of rolls, as described, and the end thereof will not be bent downward; but it will remain straight, will pass over the roll 9, and be properly wrapped around the mandrel. In case said roll, however, is a plain-faced circular one then the second roll or roll 9 will be formed irregular in cross-section, as described, so that the projections thereupon will engage with and positively lift the downturned end of the blank and carry it over said roll and properly wrap it around the mandrel. In either case therefore I do away with the stationary concave-faced guide between the rolls 8 and 9 and provide means which insure the positive guidance of the blank in proper course around the mandrel. After the welding of the blank around the mandrel the sliding bearing 7 is lowered, the mandrel withdrawn, and the operation repeated, as desired.

What I claim as my invention, and desire to secure by Letters Patent, is—

1. In a mill for forming rings or like articles, the combination of a central circular or cylindrical mandrel and a cluster of rolls around the same, one of said rolls having a longitudinal portion or portions of its positively-driven working surface extending beyond the remaining portion or portions of such working surface.

2. In a mill for forming rings or like articles, the combination of a central circular or cylindrical mandrel and a cluster of rolls around the same, one of said rolls having its positively-driven working surface provided with longitudinal projecting portions, angles or ribs, the portions of the working surface between said projecting portions being depressed.

3. In a mill for forming rings or like articles, the combination of a central circular or cylindrical mandrel and a cluster of rolls around the same, one of said rolls having its positively-driven working surface provided with longitudinal projecting portions, angles or ribs, all of said rolls having flanges at the sides of their working surfaces extending to and contacting with the mandrel.

4. In a mill for forming rings or like articles, the combination of a central circular or cylindrical mandrel and a cluster of rolls around the same, one of said rolls being irregular in cross-section, thereby providing a positively-driven working surface having longitudinal projecting ribs, angles or portions and intermediate flat or depressed portions.

5. In a mill for forming rings or like articles, the combination of a central circular or cylindrical mandrel and a cluster of rolls around the same, the first or entering roll having a longitudinal portion or portions of its working surface projecting beyond the remaining portion or portions of such working surfaces.

6. In a mill for forming rings or like articles, the combination of a central circular or cylindrical mandrel and a cluster of rolls around the same, the first or entering roll of said cluster being irregular in cross-section, thereby providing projecting portions, ribs or angles which bite and grip the blank, and intermediate flat or depressed portions which maintain the end of the blank substantially straight.

7. In a mill for forming rings or like articles, the combination of a central circular or cylindrical mandrel and a cluster of rolls around the same, the first or entering roll being polygonal in cross-section, thereby providing projecting angles for biting and gripping the end of the blank, an intermediate flat surface for maintaining the end of the blank substantially straight.

In testimony whereof I, the said GEORGE W. LA VOO, have hereunto set my hand.

GEORGE W. LA VOO.

Witnesses:
ROBERT C. TOTTEN,
F. W. WINTER.